(12) United States Patent
Kondo et al.

(10) Patent No.: US 9,792,177 B2
(45) Date of Patent: Oct. 17, 2017

(54) DATA RECOVERY CIRCUIT, SEMICONDUCTOR STORAGE DEVICE, AND DATA RECOVERY METHOD

(71) Applicant: Kabushiki Kaisha Toshiba, Minato-ku (JP)

(72) Inventors: Yosuke Kondo, Fujisawa (JP); Kenji Yoshida, Kamakura (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 57 days.

(21) Appl. No.: 14/969,169

(22) Filed: Dec. 15, 2015

(65) Prior Publication Data

US 2017/0068592 A1    Mar. 9, 2017

(30) Foreign Application Priority Data

Sep. 9, 2015 (JP) .................. 2015-177670

(51) Int. Cl.
*H03M 13/00* (2006.01)
*G06F 11/10* (2006.01)

(52) U.S. Cl.
CPC .......... *G06F 11/1068* (2013.01); *G06F 11/10* (2013.01)

(58) Field of Classification Search
CPC .............................. G06F 11/1068; G06F 11/10
See application file for complete search history.

(56) References Cited

U.S. PATENT DOCUMENTS

| 4,661,955 A | 4/1987 | Arlington et al. |
| 6,393,597 B1 | 5/2002 | Cypher |
| 2004/0123213 A1* | 6/2004 | Welbon ............. H03M 13/35 714/752 |
| 2013/0024605 A1 | 1/2013 | Sharon et al. |

* cited by examiner

*Primary Examiner* — Sam Rizk
(74) *Attorney, Agent, or Firm* — Oblon, McClelland, Maier & Neustadt, L.L.P.

(57) ABSTRACT

According to one embodiment, a data recovery circuit includes an XOR operation unit, an erroneous bit position inferring unit, an error factor inferring unit, and an error provisionally determining unit. The XOR operation unit performs a bitwise XOR operation on M data sequences of N bits, where M and N are integers of two or greater. The erroneous bit position inferring unit infers an erroneous bit position based on the XOR operation result. The error factor inferring unit infers the inverted direction of the erroneous bit. The error provisionally determining unit performs bit inversion in the erroneous bit position, the direction of the bit inversion being opposite to the inferred inverted direction.

17 Claims, 8 Drawing Sheets

FIG.4A

|   | e0 | e1 | e2 | e3 | e4 | e5 | e6 |
|---|---|---|---|---|---|---|---|
| E | 1 | 1 | 1 | 1 | 1 | 1 | 1 |
| C1' | 0 | 0 | 0 | 1 | 1 | 1 | 0 | 1 |
| C2' | 1 | 1 | 1 | 0 | 0 | 0 | 1 | 1 |
| C4' | 0 | 1 | 0 | 1 | 0 | 1 | 1 | 1 |

Note: C1' and C2' and C4' rows contain 8 values (e0–e6 plus extra).

FIG.4B

|   | e0 | e1 | e2 | e3 | e4 | e5 | e6 |
|---|---|---|---|---|---|---|---|
| E | 1 | 1 | 1 | 1 | 1 | 1 | 1 |
| C1' | 0 | 0 | 0 | 1 | 1 | 1 | 0 | 1 |
| C2' | 1 | 1 | 1 | 0 | 0 | 0 | 1 | 1 |
| C4' | 0 | 1 | 0 | 1 | 0 | 1 | 1 | 1 |

FIG.4C

|   | e0 | e1 | e2 | e3 | e4 | e5 | e6 |
|---|---|---|---|---|---|---|---|
| E | 1 | 1 | 1 | 1 | 1 | 1 | 1 |
| C1' | 0 | 0 | 0 | 1 | 0 | 1 | 0 | 1 |
| C2' | 0 | 1 | 0 | 0 | 0 | 0 | 1 | 1 |
| C4' | 0 | 1 | 0 | 1 | 0 | 1 | 1 | 1 |

FIG.4D

|   | e0 | e1 | e2 | e3 | e4 | e5 | e6 |
|---|---|---|---|---|---|---|---|
| E | 1 | 1 | 1 | 1 | 1 | 1 | 1 |
| C1' | 0 | 0 | 0 | 1 | 0 | 1 | 0 | 1 |
| C2 | 0 | 1 | 0 | 0 | 0 | 0 | 0 | 0 |
| C4' | 0 | 1 | 0 | 1 | 0 | 1 | 1 | 1 |

DATA RECOVERY CIRCUIT, SEMICONDUCTOR STORAGE DEVICE, AND DATA RECOVERY METHOD

CROSS-REFERENCE TO RELATED APPLICATIONS

This application is based upon and claims the benefit of priority from Japanese Patent Application No. 2015-177670, filed on Sep. 9, 2015; the entire contents of which are incorporated herein by reference.

FIELD

Embodiments described herein relate generally to a data recovery circuit, semiconductor storage device, and data recovery method.

BACKGROUND

This is a method that adds redundant data to data subject to recovery in order to correct data errors at the time of data recovery. As a typical example of the redundant data, a code word obtained through an XOR (exclusive OR) operation of some data can be cited. If errors exist in two or more data in the group of XOR operated data, original data cannot be recovered by the method that adds a code word obtained through an XOR operation.

BRIEF DESCRIPTION OF THE DRAWINGS

FIGS. 4A to 4D are diagrams showing data recovery methods using the XOR operation in the case where errors exist in some data sequences according to the first embodiment;

DETAILED DESCRIPTION

In general, according to one embodiment, a data recovery circuit, comprises an XOR operation unit, an erroneous bit position inferring unit, an error factor inferring unit, and an error provisionally determining unit. The XOR operation unit performs a bitwise XOR operation on M data sequences of N bits, where M and N are integers of two or greater. The erroneous bit position inferring unit infers an erroneous bit position based on the XOR operation result. The error factor inferring unit infers the inverted direction of the erroneous bit. The error provisionally determining unit performs bit inversion in the erroneous bit position, the direction of the bit inversion being opposite to the inferred inverted direction.

The data recovery circuit, semiconductor storage device, and data recovery method according to embodiments will be described in detail below with reference to the accompanying drawings. The present invention is not limited to these embodiments. Although in the embodiments below the case where a NAND flash memory as a semiconductor storage device storing data is applied to an SSD (Solid State Drive) is taken as an example, the same applies to the case where a NAND flash memory is applied to a portable storage medium such as a memory card or a USB memory, or the case where a NAND flash memory is applied to an electronic device such as a smart phone or a tablet terminal. Or the invention may be applied to cases where instead of the NAND flash memory, a nonvolatile semiconductor storage device such as an MRAM (Magnetoresistive Random Access Memory), an FRAM (registered trademark) (Ferroelectric Random Access Memory), an ReRAM (Resistive Random Access Memory), or a PCRAM (Phase Change Random Access Memory) is used, or to cases where a volatile semiconductor storage device such as a DRAM or SRAM is used.

First Embodiment

Figure 1:
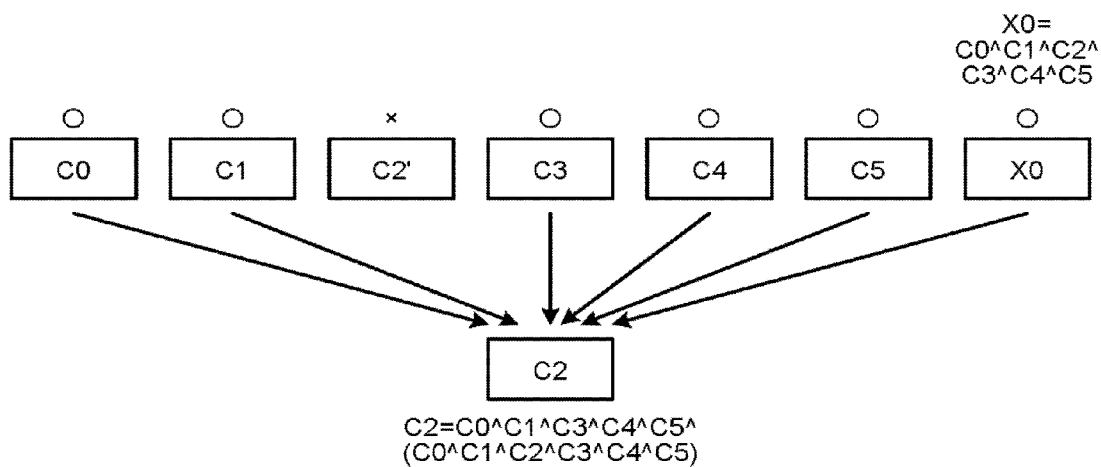
FIG. 1 is a diagram showing a data recovery method using an XOR operation in a case where errors exist in one data sequence according to a first embodiment.

FIG. 1 is a diagram showing a data recovery method using an XOR operation in a case where an error exists in one data sequence according to the first embodiment. In the embodiments below, the case where there are six data sequences C0 to C5 subject to recovery will be taken as an example.

In FIG. 1, it is assumed that data sequence X0 is added to data sequences C0 to C5 subject to recovery at the time of recording. The data sequences C0 to C5 can be given in sector units, for example. The size of one sector may be set at 512 bytes or 4 k bytes, for example. The data sequences X0 can be generated by an XOR operation of data sequences C0 to C5 and can be given by the equation: X0=C0^C1^C2^C3^C4^C5. Here, ^ indicates the XOR operation of bits in the same positions of the respective data sequences.

Further, it is assumed that the data sequences C0, C1, C3 to C5 were normally reproduced while the data sequence C2 could not be error-corrected nor normally reproduced. Data C2' is a data sequence before error correction for the C2, which could not be error-corrected. For error correction, for example, an error correction code such as the RS code or LDPC code can be used. In this case, the data sequences C0 to C5, X0 can be encoded with such the error correction code and recorded. If the data sequence X0 can be normally reproduced, the data sequence C2 can be normally reproduced through the XOR operation of the data sequences C0, C1, C3 to C5, X0. At this time, the data sequence C2 is given by the equation:

C2=C0^C1^C3^C4^C5^(C0^C1^C2^C3^C4^C5).

As such, with the method of adding a code word obtained through the XOR operation as redundant data sequence, even if what error exists in one data sequence in the group of the XOR operated data sequences, an original data sequence can be recovered by the XOR operation.

FIGS. 2, 3A, 3B, and 4A to 4D are diagrams showing a data recovery method using the XOR operation in a case where errors exist in some data sequences according to the first embodiment. In the embodiments below, a case where the data sequences C0 to C5 each consist of eight bits will be taken as an example.

Figure 2:
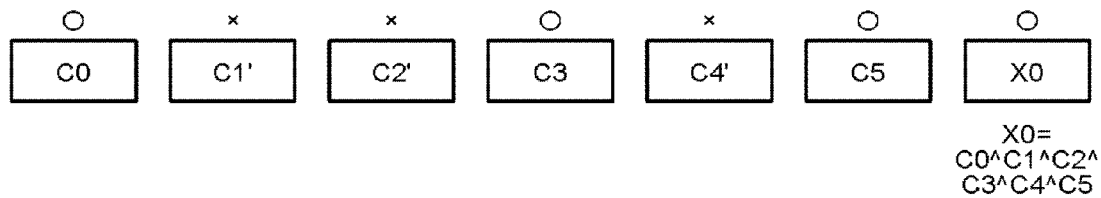
FIG. 2 is a diagram showing a data recovery method using the XOR operation in a case where errors exist in some data sequences according to the first embodiment.

In FIG. 2, it is assumed that the data sequences C0, C3, C5, X0 were normally reproduced while the data sequences C1, C2, C4 failed to be error-corrected and could not be normally reproduced. Data C1', C2', C4' are data sequences before error correction for the C1, C2, C4 respectively, which could not be error-corrected. If there are some data sequences that could not be error-corrected, the XOR operation is used in inferring erroneous bit positions.

Figure 3A:
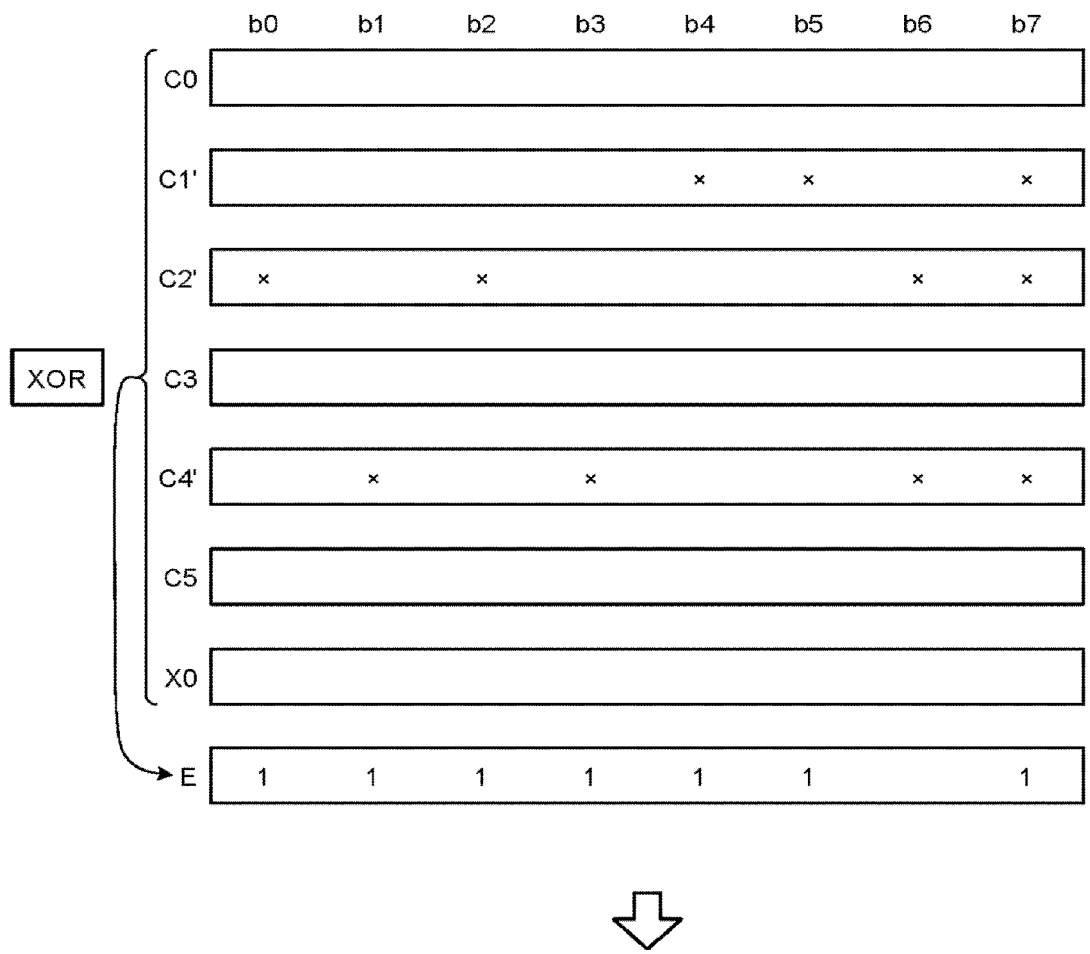
FIGS. 3A and 3B are diagrams showing data recovery methods using the XOR operation in the case where errors exist in some data sequences according to the first embodiment.
Figure 3B:
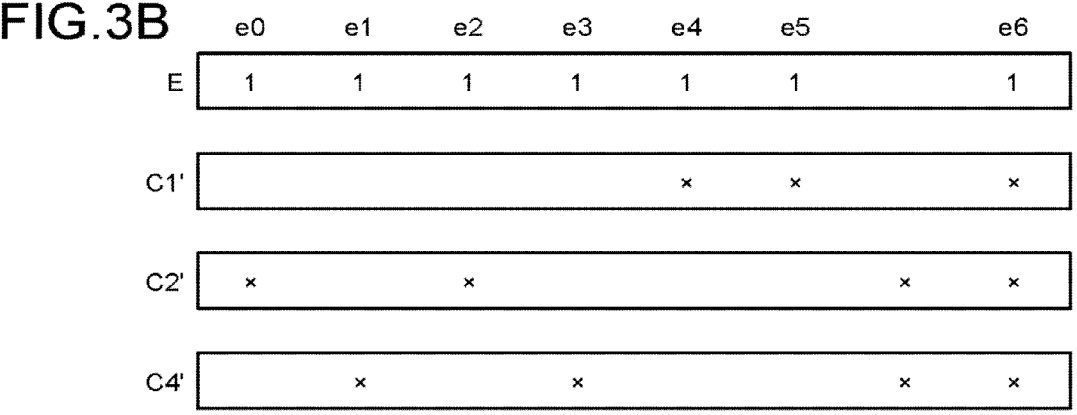

That is, in FIG. 3A, an example of erroneous bit positions b0 to b7 of the data sequences C1', C2', C4' is indicated by marks x. That is, suppose that in the data sequence C1', errors exist in bit positions b4, b5, b7; in the data sequence C2', errors exist in bit positions b0, b2, b6, b7; and in the data sequence C4', errors exist in bit positions b1, b3, b6, b7. A data sequence E is generated through an XOR operation data sequences C0, C1', C2', C3, C4', C5, X0. In this XOR operation, for the data sequences C1', C2', C4', the data sequences C1', C2', C4' before error correction are used. The erroneous bit positions b0 to b7 of the data sequences C1', C2', C4' are reflected in the data sequence E, so that 1 is set in erroneous bit candidate positions of the data sequences C1', C2', C4'. That is, as shown in FIG. 3B, letting erroneous bit positions e0 to e6 denote bit positions b0 to b5, b7, where 1 is set, in the data sequence E, the erroneous bit positions e0 to e6 each indicate that an error exists in either the data sequences C1' or C2' or C4'. Note that if errors exist in the same bit position of some data sequences as in b6 of the data sequence E, and the number of erroneous data sequence is even, then the result of the XOR operation is zero, resulting in information about the erroneous bit position disappearing.

The reason why the data sequences C1', C2', C4' before error correction are used in generating the data sequence E through the XOR operation is that as to code words which could not be error-corrected, the data sequences C1', C2', C4' before error correction are often closer in Hamming distance to the correct code words than the data sequences after error correction.

When only looking at the erroneous bit positions e0 to e6, where 1 is set, in the data sequence E, it cannot be seen of which data sequences C1', C2', or C4' errors exist in the erroneous bit positions e0 to e6. Accordingly, assuming that an error exists in the erroneous bit position e0 to e6 of only one data sequence, either the data sequences C1' or C2' or C4', the one data sequence can be inferred. At this time, the foreseeable inverted direction of an erroneous bit can be assumed under predetermined conditions. For example, supposing that the data sequences C0 to C5, X0 are recorded in a NAND flash memory, the inverted direction of the erroneous bits in the erroneous bit positions e0 to e6 can be assumed based on error factors specific to the NAND flash memory. As error factors specific to the NAND flash memory, data retention, read disturb, write disturb, an inter-cell coupling effect at the time of reading, and an inter-cell coupling effect at the time of writing can be cited. The data retention is a phenomenon where electric charge held in a memory decreases over time. The read disturb, write disturb, and inter-cell coupling effect are a phenomenon where electric charge held in a memory increases at the time of reading or writing. Since, in the NAND flash memory, read and write are performed on a page basis, read disturb and write disturb occur on a page basis. For example, if the data retention occurs in a single-level cell where binary data is recorded, data stored in the memory cell may change from 0 to 1 incorrectly. If the read disturb, write disturb, or inter-cell coupling effect occurs in a single-level cell, data stored in the memory cell may change from 1 to 0 incorrectly.

In this case, for each error factor specific to the NAND flash memory, the inverted direction of an erroneous bit can be determined to be in one direction. Hence, by designating one error factor specific to the NAND flash memory, for all the erroneous bit positions e0 to e6, where errors exist, the inverted direction of the erroneous bit can be determined to be in one direction. Then if there is only one data sequence which has the binary value in the inverted direction of an erroneous bit in an erroneous bit position e0 to e6 from among the data sequences C1', C2', C4', which could not be error-corrected, then it can be inferred that the one data sequence has an error in that erroneous bit position e0 to e6. Then the data sequences C1', C2', C4', which could not be error-corrected, can be provisionally recovered from by inverting bits in erroneous bit positions e0 to e6 of one data sequence of the data sequences C1', C2', C4'. Then it can be determined whether the provisional recovery is correct by performing error correction on the provisionally recovered data sequence again.

For example, as shown in FIG. 4A, suppose that data sequence C1'=00011101, C2'=11100011, and C4'=01010111. In the data sequences C1', C2', C4', true erroneous bit positions are indicated by hatching. For example, since E has 1 in erroneous bit position e0, it is understood that errors exist in one or more of the multiple data sequences C1', C2', C4', but it cannot be understood in which of the data sequences C1', C2', C4' an error exists. Here, suppose that bit inversion in the erroneous bit position is due to the data retention. The data retention causes data stored in a single-level cell to change from 0 to 1 incorrectly. Thus, bit positions of the data sequences C1', C2', C4', where a value of 0 is held, are regarded as free of an error. Hence, for example, from among the data sequences C1', C2', C4', a data sequence which has a value of 1 in erroneous bit position e0 is searched for. If only one data sequence has a value of 1 in erroneous bit position e0, it can be determined that the one data sequence has an error in erroneous bit position e0. That is, as shown in FIG. 4B, because only the data sequence C2' has a value of 1 in erroneous bit position e0, it can be determined that the data sequence C2' has an error in erroneous bit position e0. Likewise, because only the data sequence C2' has a value of 1 in erroneous bit position e2, it can be determined that the data sequence C2' has an error in erroneous bit position e2. Likewise, because only the data sequence C1' has a value of 1 in erroneous bit position e4, it can be determined that the data sequence C1' has an error in erroneous bit position e4. Open-circle marks indicate bit positions in which data is uniquely determined to have errors.

On the other hand, because the data sequences C2', C4' have a value of 1 in, e.g., erroneous bit position e1, it cannot be determined which data sequences C2' or C4' has an error.

Then, as shown in FIG. 4C, if the erroneous bit positions e0, e2, e4 in which only one data sequence, either the data sequences C1' or C2' or C4', has a value of 1 are found out, then data sequences C1" and C2" are generated by inverting the value of 1 in the erroneous bit positions e0, e2, e4 to 0. Bit inversion due to the data retention can be reversed back by inverting 1 to 0. Then error correction is performed on the data sequence C2", for example. At this time, if the number of erroneous bits in the data sequence C2" is within the range in which correction is possible, the data sequence C2 can be recovered. Here, suppose that the data sequence C2 was recovered as C2=01000000 through error correction of the data sequence C2" as shown in FIG. 4D. In this case, only the data sequence C4' has a value of 1 in erroneous bit position e1, so that it can be determined that there is an error in erroneous bit position e1 of the data sequence C4'. Then error correction can be performed by inverting the value of 1 in the erroneous bit position e1 to 0. Then, if the number of erroneous bits is within the range in which correction is possible, the data sequence C4 can be recovered. By repeating the above process, finally all the data sequences can be recovered.

As such, in the case of errors due to the data retention, a data sequence can be provisionally recovered by inverting the values in the erroneous bit positions e0 to e6 from 1 to 0 deciding that the bit inversion of erroneous bits takes one direction. Therefore, erroneous bits can be efficiently inferred so as to increase the possibility that data sequences can be recovered.

Meanwhile, where there are P erroneous it positions in M data sequences each consisting of N bits, where and N are integers of two or greater and P is an integer of two or greater that is smaller than or equal to N, when provisionally recovered data sequences are derived assuming that the bit inversion of erroneous bits randomly occurs, there are $2^P$ number of combinations for each data sequences. Then at that time, in order to determine through error correction whether provisionally recovered data sequence is correct, an error correction operation needs to be performed on these combinations, resulting in the number of times of error correction operation being enormous. That is, where some data sequences which could not be error-corrected are recovered from, erroneous bit candidates can be obtained through an XOR operation, but, if the bit inverted direction of erroneous bits cannot be inferred, the number of bit inversion combinations takes on an erroneous number, so that it is difficult to recover from some data sequences that could not be error-corrected.

With FIG. 4C, the method of performing error correction by inverting the value of 1 to 0 in the erroneous bit positions e0, e2, e4 in which only one of the data sequences C1', C2', C4' has a value of 1 has been described. Bits to be inverted may be selected assuming that errors exist in the erroneous bit positions e0 to e6 of only one data sequence, either the data sequences C1' or C2' or C4', or bits of some data sequences or all the data sequences may be inverted. For example, in the case of errors due to the data retention, error correction may be performed after inverting all the values of 1 in the erroneous bit positions e0 to e6 to 0. At this time, since the data retention is an error factor specific to the NAND memory, bits actually inverted due to error can be selected in high probability, so that the possibility of being able to recover by one more error correction may be increased.

Although in the above embodiment the method that performs an XOR operation on the data sequences C0 to C5, X0 before being encoded with an error correction code has been described, an XOR operation may be performed on data sequences after being encoded with an error correction code, which data sequence includes redundant data used in error correction code encoding. In this case, a memory to store XORed data sequence obtained from the redundant data of the error correction is needed, but error-correction encoding the XORed data sequence can be made not necessary.

Figure 5:
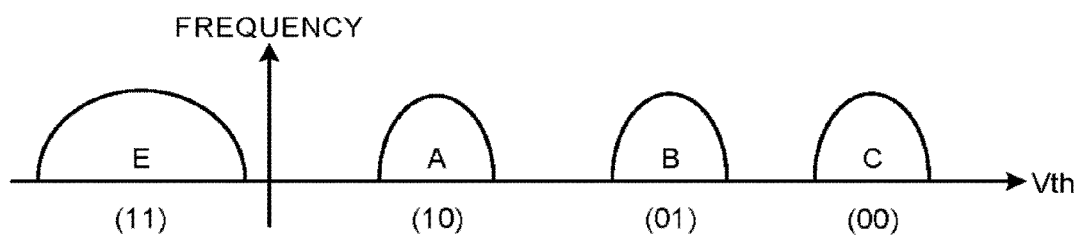
FIG. 5 is a diagram showing an example of threshold distribution when memory cells have a four-valued storage state.

FIG. 5 is a diagram showing an example of the threshold distribution when memory cells have a four-valued storage state.

In FIG. 5, E indicates the lowest-level threshold distribution when the four-valued state is stored; A indicates the third highest-level threshold distribution; B indicates the second highest-level threshold distribution; and C indicates the highest-level threshold distribution. These threshold distributions E, A to C can be set to correspond to two-bit data '11', '10', '01', '00' respectively. The data retention changes the threshold distributions such that thresholds Vth decrease. Hence, if the data retention occurs, the threshold distribution changes from C to B, or from B to A, or so on. As a result, with single-level cells, 0 changes to 1 incorrectly due to the data retention, whereas with multi-level cells, it cannot be identified whether 0 changes to 1 or 1 changes to 0 incorrectly due to the data retention. Hence, for multi-level cells, the inverted direction of erroneous bits can be inferred based on the way that the bit changes incorrectly according to deviation of the threshold associated with the increase/decrease in charge held in the memory cell.

Although in the example of FIG. 5 the case where memory cells have the four-valued storage state is taken as an example, the same applies to cases where memory cells have a multi-valued, three or greater-valued, storage state.

Second Embodiment

Figure 6:
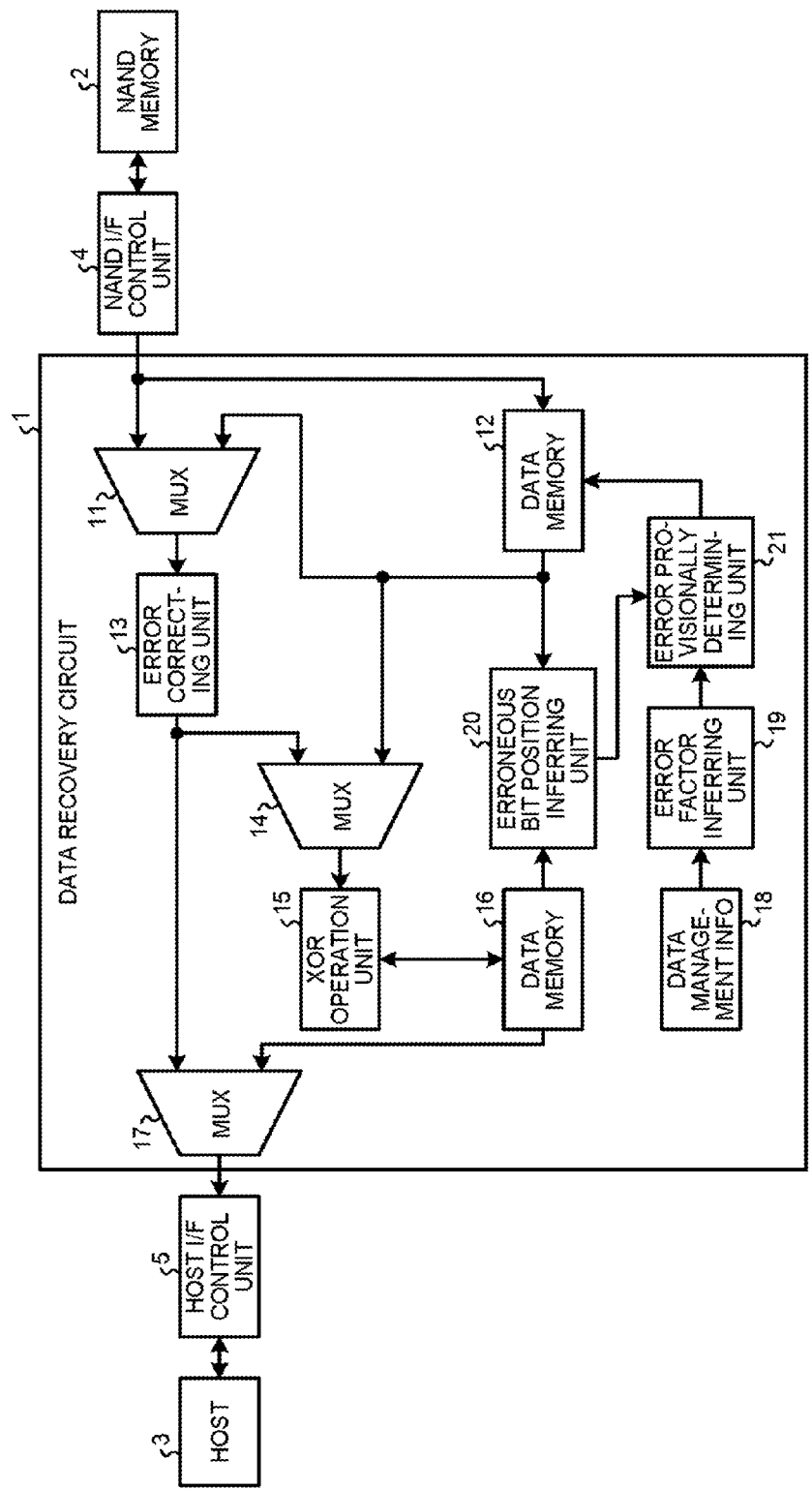
FIG. 6 is a block diagram showing schematically configuration of a data recovery circuit according to a second embodiment.

FIG. 6 is a block diagram showing schematically the configuration of a data recovery circuit according to the second embodiment.

In FIG. 6, the data recovery circuit 1 is provided with multiplexers 11, 14, 17, data memories 12, 16, an error correcting unit 13, an XOR operation unit 15, data management information 18, an error factor inferring unit 19, an erroneous bit position inferring unit 20, and an error provisionally determining unit 21. Mote that the data recovery circuit 1 may be constituted by hardware or firmware. The data memory 12 stores data sequences before error correction that is recorded in a NAND memory 2. The multiplexer 11 selects either data sequences read from the NAND memory 2 or data sequences stored in the data memory 12 to output. The error correcting unit 13 performs error correction on data sequences outputted from the multiplexer 11. For this error correction, an error correction code such as the RS code or LDPC code can be used. The multiplexer 14 selects either data sequences without an error outputted from the error correcting unit 13 or data sequences before error correction stored in the NAND memory 2 to output. The XOR operation unit 15 performs an XOR operation on data sequences outputted from the multiplexer 14. The data memory 16 stores the XOR operation result of the XOR operation unit 15. The data management information 18 manages data sequences recorded in the NAND memory 2. For example, the data management information 18 can manage the elapsed time after recorded of data sequences recorded in the NAND memory 2 on a page basis. The error factor inferring unit 19 infers the inverted direction of erroneous bits based on an error factor specific to the NAND memory 2. The erroneous bit position inferring unit 20 infers erroneous bit positions based on the XOR operation result of the XOR operation unit 15. The error provisionally determining unit 21 performs bit inversion in the erroneous bit positions inferred by the erroneous bit position inferring unit 20, the direction of which inversion is opposite to the inverted direction inferred by the error factor inferring unit 19.

The data recovery circuit 1 is connected to the NAND memory 2 via a NAND I/F control unit 4 and connected to a host 3 via a host I/F control unit 5. The NAND I/F control unit 4 controls sending/receiving data sequences to/from the NAND memory 2. The host I/F control unit 5 controls sending/receiving data sequences to/from the host 3.

The NAND I/F control unit 4 converts data sequences read in page units from the NAND memory 2 into data sequences in sector units to send to the multiplexer 11 and to store into the data memory 12. The multiplexer 11 selects either data sequences read from the NAND memory 2 or data sequences read from the data memory 12 to send to the error correcting unit 13.

Then in the error correcting unit 13, data sequences outputted from the multiplexer 11 is error-corrected, and, if there is no data sequence which cannot be error-corrected, data without an error is sent in sector units to the host 3 via the multiplexer 17.

If only one data sequence cannot be error-corrected by the error correcting unit 13, a data sequence without an error, other than the data sequence which cannot be error-corrected, is sent to the XOR operation unit 15 via the multiplexer 14. Then the XOR operation unit 15 performs an XOR operation of these data sequences, so that the one data sequence which could not be error-corrected is recovered and stored into the data memory 16. Then a data sequence without an error outputted from the error correcting unit 13 and a data sequence without an error read from the data memory 16 are sent in sector units to the host 3 via the multiplexer 17.

If some data sequences cannot be error-corrected by the error correcting unit 13, data sequences without an error is sent from the error correcting unit 13 to the multiplexer 17, and the data sequences before correction which cannot be error-corrected is sent from the data memory 12 to the multiplexer 14. Then these data sequences are sent to the XOR operation unit 15 via the multiplexer 14. Then the XOR operation unit 15 performs an XOR operation on data sequences sent from the multiplexer 14 so as to detect erroneous bit positions to store into the data memory 16. Then the error factor inferring unit 19 infers the inverted direction of erroneous bits from the data management information 18 and sends the inferring result to the error provisionally determining unit 21. At this time, if the elapsed time after recorded of data sequences read this time from the NAND memory 2 exceeds a predetermined value, the occurrence of an error due to the data retention can be inferred. With this error, it can be inferred that data sequences of a single-level cell changes from 0 to 1 incorrectly. Or if, after the page read this time from the NAND memory 2 had been recorded into the NAND memory 2, reading from or writing into a page adjacent to the page took place, then an error due to the read disturb, write disturb, or inter-cell coupling effect can be inferred. With this error, it can be inferred that data sequences of a single-level cell changes from 1 to 0 incorrectly. The erroneous bit position inferring unit 20 infers erroneous bit positions from the XOR operation result stored in the data memory 16 and sends the inferring result to the error provisionally determining unit 21. Then the error provisionally determining unit 21 performs bit inversion in the erroneous bit positions inferred by the erroneous bit position inferring unit 20, the direction of which inversion is opposite to the inverted direction inferred by the error factor inferring unit 19 so as to store into the data memory 12. Then a data sequence stored in the data memory 12 is sent to the error correcting unit 13 via the multiplexer 11, so that error correction is performed again on the data sequence, which could not be error-corrected the preceding time. The above process is repeated until all the data sequences read this time from the NAND memory 2 become free of an error, and thus all the data sequences read this time from the NAND memory 2 can be recovered from.

Figure 7:
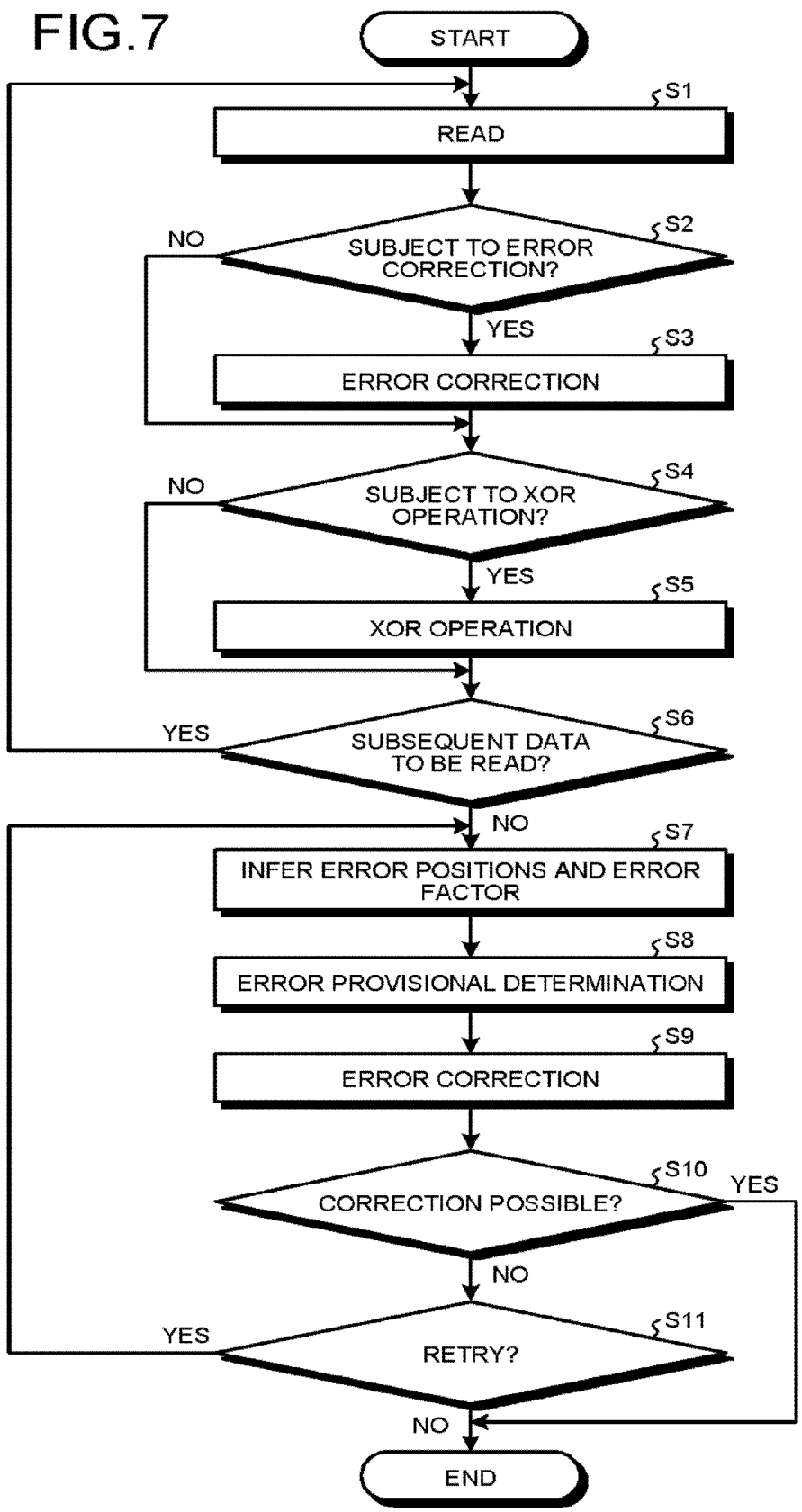
FIG. 7 is a flow chart showing operation of the data recovery circuit according to the second embodiment.

FIG. 7 is a flow chart showing the operation of the data recovery circuit according to the second embodiment.

In FIG. 7, the data recovery circuit reads data sequences from the NAND memory 2 (S1). Then it is determined whether data sequences read this time is subject to error correction (S2). If the data sequence is subject to error correction (Yes at S2), error correction is performed (S3), and, if not (No at S2), error correction is skipped.

Then it is determined whether data sequences not subject to error correction and error-corrected data sequences are subject to an XOR operation (34). If the data sequence is subject to an XOR operation (Yes at 34), the XOR operation is performed (S5), and, if not (No at S4), the XOR operation is skipped.

Then it is determined whether subsequent data sequence is to be read from the NAND memory 2 (S6). Then if subsequent data sequence is to be read (Yes at S6), the process from S1 to 36 is repeated, and, if not (No at 36), error positions and the error factor are inferred (S7). Note that reading subsequent data sequences can be repeated on a page basis until data necessary to error-correct is obtained in a sector unit.

Then after error provisional determination is performed based on the results of inferring error positions and the error factor (S8), error correction is performed again (S9). Then it is determined whether a data sequence after error provisional determination can be error-corrected (S10). If error correction is possible (Yes at S10), the process finishes, and, if error correction is impossible (No at S10), it is determined whether to retry (S11). If a retry is to be performed (Yes at S11), the process from S7 to S11 is repeated, and, if not (No at S11), the process ends.

Third Embodiment

Figure 8:
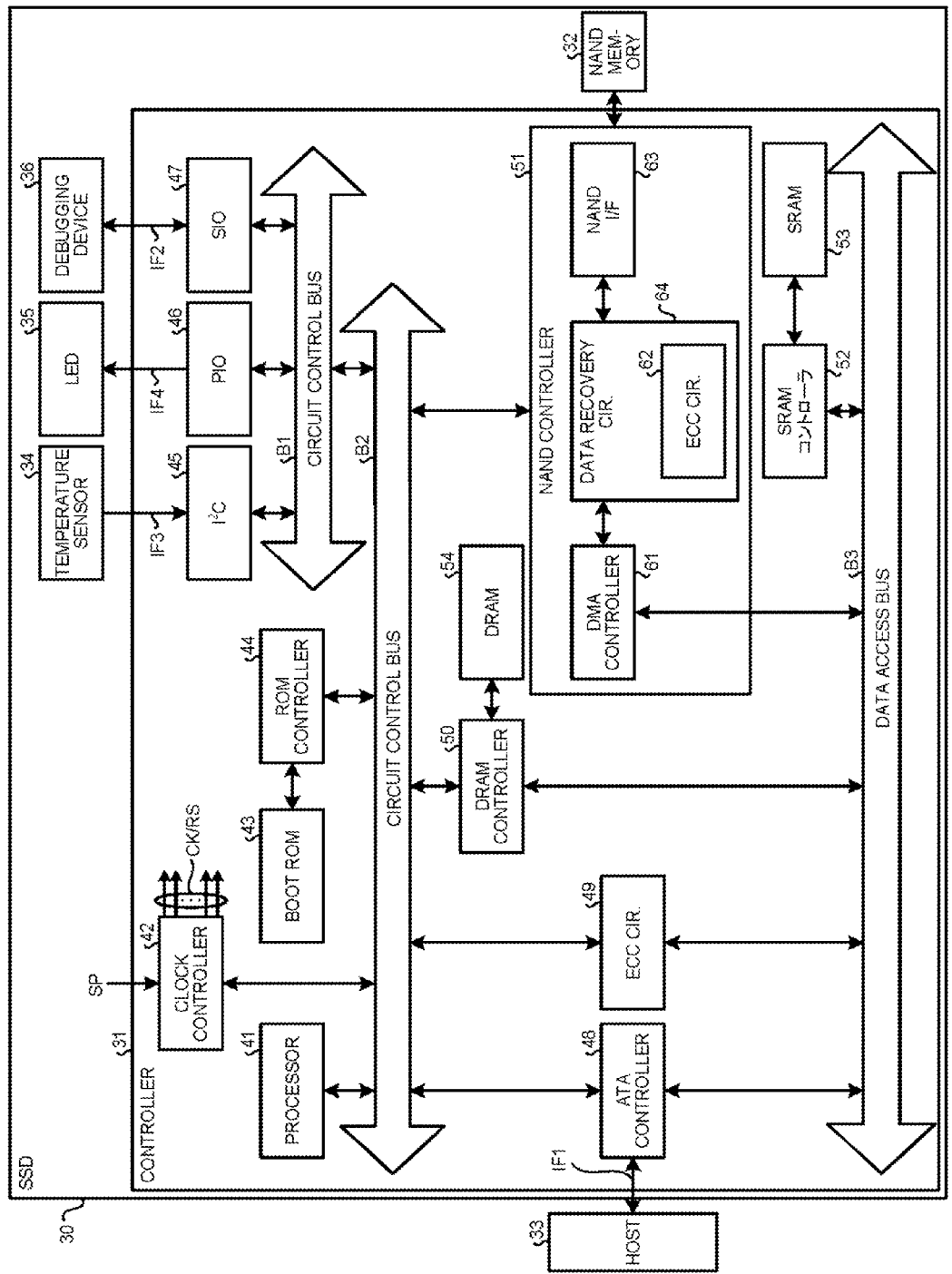
FIG. 8 is a block diagram showing schematically configuration of a semiconductor storage device according to a third embodiment.

FIG. 8 is a block diagram showing schematically the configuration of a semiconductor storage device according to the third embodiment.

In FIG. 8, a solid state drive (SSD) 30 is provided with a NAND memory 32 for storing data sequences, a temperature sensor 34 for detecting the temperature inside the solid state drive 30, a light-emitting diode 35 for displaying a state, and a controller 31 for controlling these. The controller 31 is provided with circuit control buses B1, B2 and a data access bus B3. A processor 41 to control the entire controller 31 is connected to the circuit control bus B2. Further, a boot ROM 43 storing boot programs for management programs (FW) is connected to the circuit control bus B2 via a ROM controller 44.

Further, a clock controller 42 that supplies a reset signal RS and a clock signal CK to each part when receiving a power-on/off reset signal SP is connected to the circuit control bus B2.

Further, the circuit control bus B1 is connected to the circuit control bus B2. And an I$^2$C circuit 45 that receives data from the temperature sensor 34 via an interface IF3, a parallel IO circuit 46 that supplies a status display signal to the light-emitting diode 35 via an interface IF4, and a serial IO circuit 47 that communicates with a debugging device 36 via an RS232C interface IF2 are connected to the circuit control bus B1.

Further, an ATA interface controller 48 that controls an ATA interface IF1, an ECC circuit 49 that performs error-correction on data sequences read from and to be written into the NAND memory 32, a NAND controller 51 that controls read, write, and erase for the NAND memory 32, and a DRAM controller 50 that controls read, write, and erase for a DRAM 54 are connected to both the data access bus B3 and the circuit control bus B2. The for-data-transfer or for-work-area DRAM 54 is connected to the DRAM controller 50.

The ATA interface controller 48 is used to transmit/receive data sequences to/from a host 33 via the ATA interface IF1.

Further, an SRAM 53 used as a data work area is connected to the data access bus B3 via an SRAM controller 52.

The NAND controller 51 is provided with a NAND interface 63 to transmit/receive data sequences to/from the NAND memory 32 and a DRAM controller 61 for controlling DRAM transfer between the NAND memory 32 and the DRAM 54. Further, the NAND controller 51 is provided with a data recovery circuit 64. The data recovery circuit 64 is provided with an ECC circuit 62 that performs error correction on data sequences read from and to be written into the NAND memory 32. The data recovery circuit 64 can be configured in the same way as the data recovery circuit 1 in FIG. 6. In this case, the ECC circuit 62 can be used as the error correcting unit 13 of FIG. 6. The DRAM 54 may be used as the data memories 12, 16 of FIG. 6. The data management information 18 of FIG. 6 can be stored in the NAND memory 32.

Figure 9:
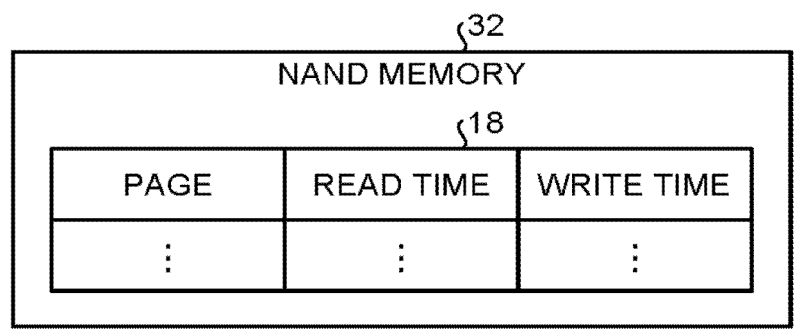
FIG. 9 is a diagram showing an example of data management information of FIG. 6.

FIG. 9 is a diagram showing an example of the data management information of FIG. 6.

In FIG. 9, the data management information 18 can have time when a data sequence was read from the NAND memory 32 and time when the data sequence was written for each page. The elapsed time from recording into the NAND memory 32 to reading can be determined from the read time and write time of the page read this time from the NAND memory 32. Then if the elapsed time from recording into the NAND memory 32 to reading exceeds a predetermined value, then an error due to the data retention can be inferred. Or an error due to the read disturb, write disturb, or inter-cell coupling effect can be inferred from the read time of the page read this time from the NAND memory 32 and the read time or write time of a page adjacent to that page.

Referring back to FIG. 8, when the power-on/off reset signal SP is supplied to the clock controller 42, the clock controller 42 supplies the reset signal RS and clock signal CK to each part. Then the ROM controller 44 reads boot programs from the boot ROM 43 to transfer to the processor 41. Then the processor 41 loads management programs from the NAND memory 32 into the SRAM 53. Then the NAND controller 51, accessing the NAND memory 32, can control read, write, and erase for the NAND memory 32 according to the management programs loaded into the SRAM 53. Here, the ECC circuit 62 performs error correction on data sequences read from the NAND memory 32. At this time, if there are some data sequences which cannot be error-corrected, the data management information 18 is read from the NAND memory 32 and given to the error factor inferring unit 19. Then the data recovery circuit 64 recovers from some data sequences which could not be error-corrected by the ECC circuit 62 from among data sequences read from the NAND memory 32.

Although FIG. 8 shows the configuration where the NAND controller 51 is provided with the data recovery circuit 64, the process of the data recovery circuit 64 may be realized by the processor 41.

Although the above embodiment describes the configuration where the data recovery circuit is applied to the solid state drive 30, the data recovery circuit may be applied to an SD card, a USB memory, or the like. The data recovery circuit can be applied to all products having a NAND flash memory mounted therein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data recovery circuit comprising:
    an XOR operation unit that performs a bitwise XOR operation on M data sequences of N bits, where M and N are integers of two or greater;
    an erroneous bit position inferring unit that infers an erroneous bit position based on the XOR operation result;
    an error factor inferring unit that infers the inverted direction of the erroneous bit; and
    an error provisionally determining unit that performs bit inversion in the erroneous bit position, the direction of the bit inversion being opposite to the inferred inverted direction.

2. The data recovery circuit of claim 1, comprising an error correcting unit that performs error correction on the M data sequences and identifies K data sequences which could not be error-corrected, where K is an integer of two or greater and smaller than or equal to M.

3. The data recovery circuit of claim 2, wherein the erroneous bit position inferring unit infers, as the erroneous bit positions, bit positions in which one of the K data sequences which could not be error-corrected takes on a value in the inverted direction among P bit positions determined to have errors through the XOR operation, where P is an integer of two or greater and smaller than or equal to N.

4. The data recovery circuit of claim 2, wherein if there are the K data sequences which could not be error-corrected, the XOR operation unit performs a bitwise XOR operation on the K data sequences before error correction and (M-K) data sequences having no error.

5. The data recovery circuit of claim 2, wherein the error correcting unit performs error correction on the data sequence bit-inverted by the error provisionally determining unit again.

6. The data recovery circuit of claim 5, wherein the erroneous bit position inferring unit infers, as the erroneous bit positions, bit positions in which one of the data sequence which could not be error-corrected the last time except the data sequence which could be error-corrected this time takes on a value in the inverted direction among P bit positions determined to have errors through the XOR operation, where P is an integer of two or greater and smaller than or equal to N.

7. The data recovery circuit of claim 6, wherein bit inversion in the erroneous bit positions, the direction of which is opposite to the inverted direction, and the error correction are repeated until the M data sequences become free of an error.

8. A semiconductor storage device comprising:
a NAND memory that stores data; and
a controller that controls the NAND memory,
wherein the controller comprises:
a data recovery circuit that infers an erroneous bit position based on a result of a bitwise XOR operation of M data sequences of N bits, where M and N are integers of two or greater, and that performs bit inversion in the erroneous bit position, the direction of the bit inversion being opposite to an inverted direction inferred for the erroneous bit; and
an interface circuit that transmits/receives data to/from the NAND memory.

9. The semiconductor storage device of claim 8, wherein the data recovery circuit infers the inverted direction of the erroneous bits based on an error factor specific to the NAND memory.

10. The semiconductor storage device of claim 9, wherein the error factor is data retention, read disturb, write disturb, an inter-cell coupling effect at a time of reading, or an inter-cell coupling effect at a time of writing.

11. The semiconductor storage device of claim 9, wherein the data recovery circuit comprises:
an XOR operation unit that performs a bitwise XOR operation on M data sequences of N bits, where M and N are integers of two or greater;
an erroneous bit position inferring unit that infers an erroneous bit position based on the XOR operation result;
an error factor inferring unit that infers the inverted direction of the erroneous bit; and
an error provisionally determining unit that performs bit inversion in the erroneous bit position, the direction of the bit inversion being opposite to the inferred inverted direction.

12. The semiconductor storage device of claim 11, comprising an error correcting unit that performs error correction on the M data sequences and identifies K data sequences which could not be error-corrected, where K is an integer of two or greater and smaller than or equal to M.

13. The semiconductor storage device of claim 12, wherein the erroneous bit position inferring unit infers, as the erroneous bit positions, bit positions in which only one of the K data sequences which could not be error-corrected takes on a value in the inverted direction among P bit positions determined to have errors through the XOR operation, where P is an integer of two or greater and smaller than or equal to N.

14. The semiconductor storage device of claim 12, wherein if there are the K data sequences which could not be error-corrected, the XOR operation unit performs an XOR operation on the K data sequences before error correction and (M-K) data sequences having no error.

15. The semiconductor storage device of claim 12, wherein the error correcting unit performs error correction on the data sequence bit-inverted by the error provisionally determining unit again.

16. The semiconductor storage device of claim 15, wherein the erroneous bit position inferring unit infers, as the erroneous bit positions, bit positions in which one of the data sequence which could not be error-corrected the last time except the data sequence which could be error-corrected this time takes on a value in the inverted direction among P bit positions determined to have errors through the XOR operation, where P is an integer of two or greater and smaller than or equal to N.

17. The semiconductor storage device of claim 16, wherein bit inversion in the erroneous bit positions, the direction of which is opposite to the inverted direction, and the error correction are repeated until the M data sequences become free of an error.

* * * * *